S. B. DUNN.
VETERINARY MOLAR EXTRACTOR.
APPLICATION FILED AUG. 2, 1909.
991,772.
Patented May 9, 1911.
2 SHEETS—SHEET 2.
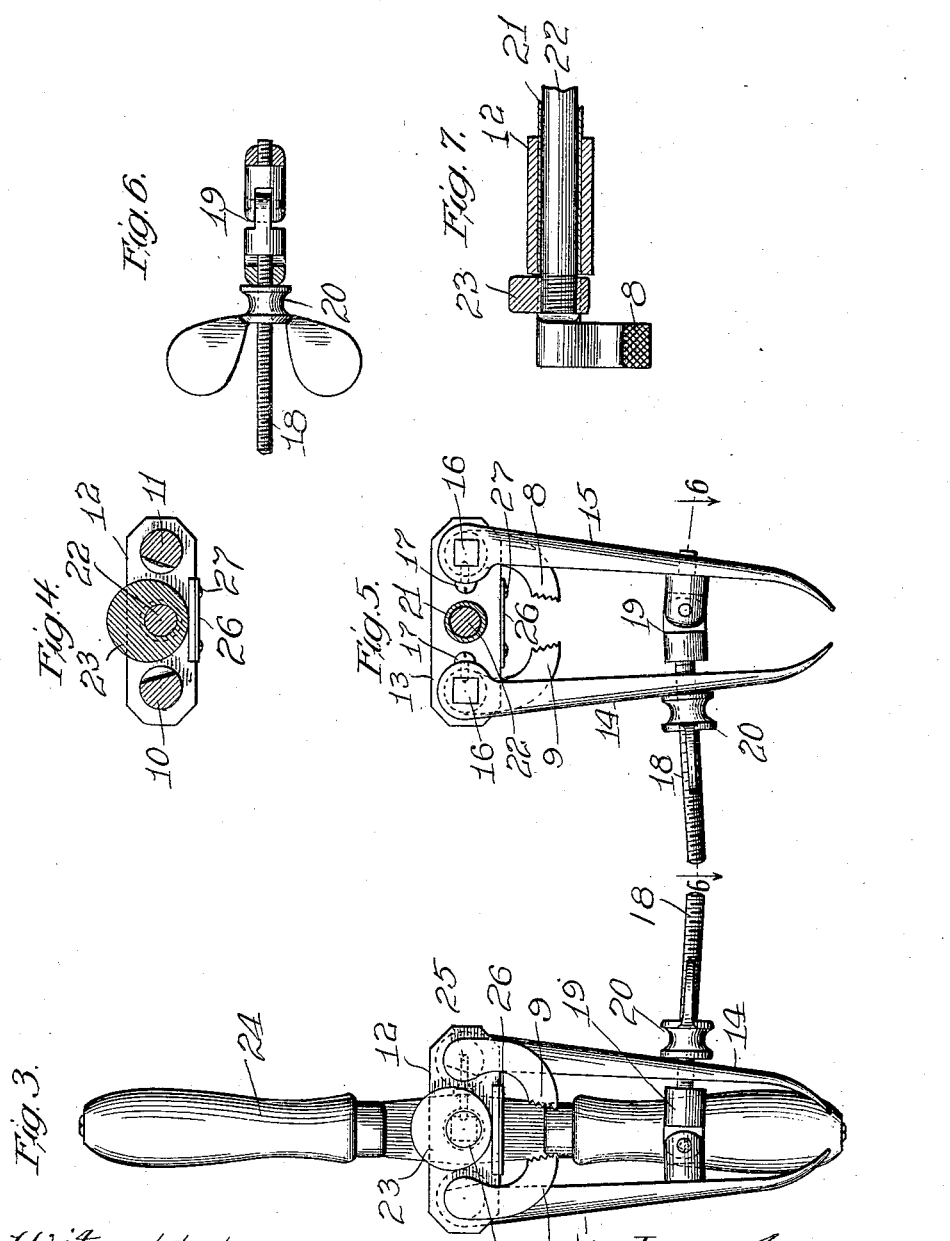

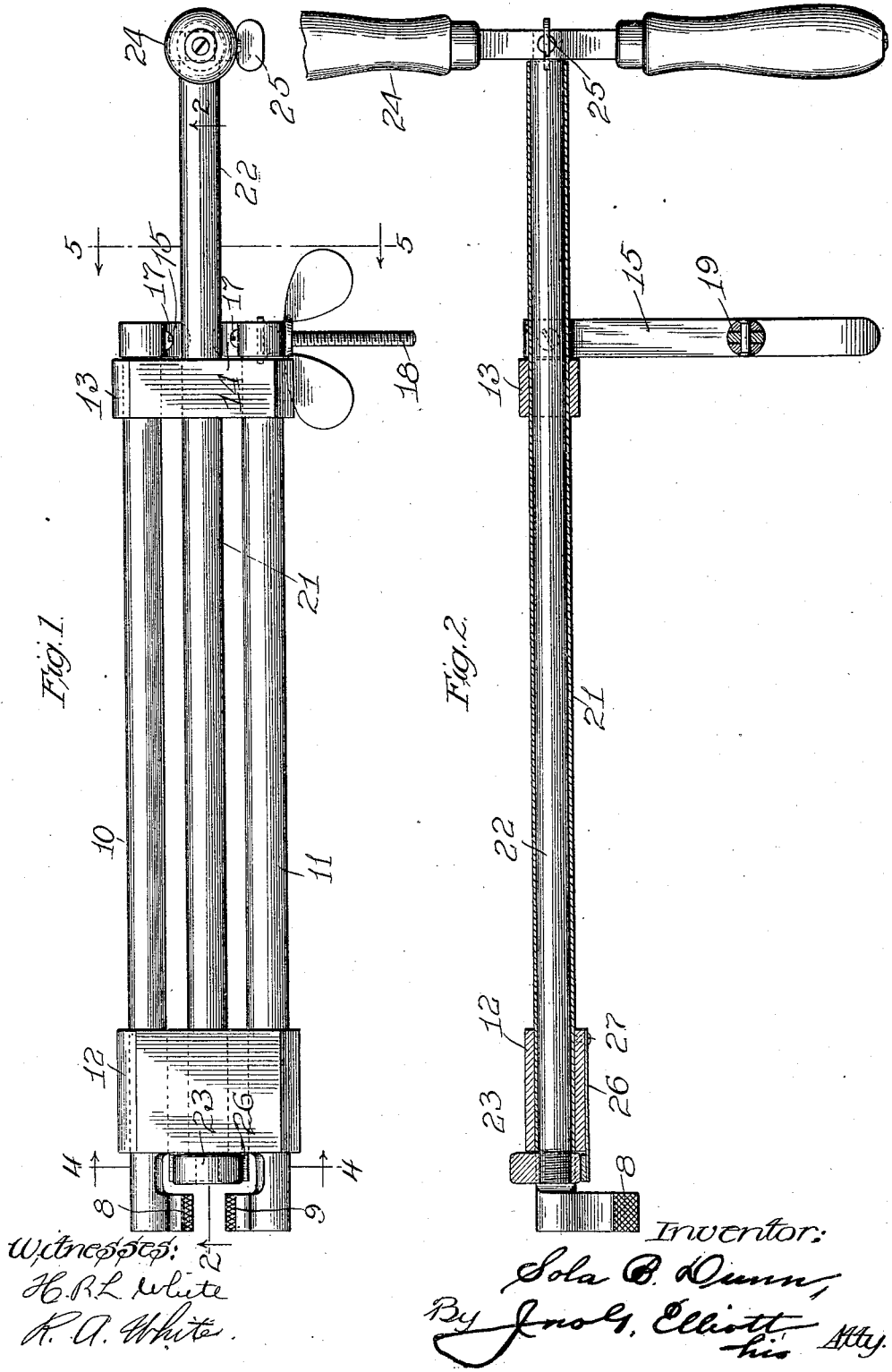

UNITED STATES PATENT OFFICE.

SOLA B. DUNN, OF CHICAGO, ILLINOIS.

VETERINARY MOLAR-EXTRACTOR.

991,772.  Specification of Letters Patent.  Patented May 9, 1911.

Application filed August 2, 1909. Serial No. 510,690.

*To all whom it may concern:*

Be it known that I, SOLA B. DUNN, a citizen of the United States, and a resident of Chicago, in the county of Cook and State of Illinois, have invented certain new and useful Improvements in Veterinary Molar-Extractors, of which the following is a full, clear, and exact specification.

This invention relates to improvements in veterinary molar extractors in which the jaws of the extractor have been simultaneously actuated toward a closing position upon the molar of a horse or other animal by a reverse axial movement by means of arms secured to and projecting at right angles toward the ends of the shanks of the jaws actuated by a thumb nut on a screw rod passing through one of said arms and secured to the other arm against turning, there being no means, however, by which the grasped tooth may be loosened in or pulled from its socket except by the main strength of the operator as in the use of forceps for extracting teeth from human beings.

The teeth of animals, and particularly horses, are so large and firmly set in their sockets, and frequently subject to malformation of their roots, that in many instances it is possible only for a very powerful operator to loosen a molar tooth as they have heretofore done by wrenching the tooth or by using the incisors as a fulcrum for the shanks of the jaws. Indeed, in many instances, the malformation of the molar is such that it is impossible for an operator, either by main strength or awkwardness, or both, to loosen them in their sockets, the result being that they are cored out, or the side of the jaw bone first cut away before they can loosen or extract them, while, in the meantime, the animal is suffering untold excruciating torture substantially entirely avoided by my invention.

The object of my invention is to provide means whereby, after a firm hold is taken upon a molar by the forceps, a mechanical force may be applied to lift the tooth vertically out of its socket, and by very simple means, operating with perfect certainty, and without injury to the animal or producing any possible avoidable pain to it.

A further object of my invention is to provide a broad base fulcruming the extractor upon the teeth forward of the molar to be extracted, and whereby the strain or force lifting the tooth is vertically through the teeth upon which the implement is fulcrumed.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

In said drawings: Figure 1 illustrates a top plan view of a veterinary molar extractor embodying my invention. Fig. 2 is a longitudinal detailed section showing the construction and arrangement of the extracting or lifting device. Fig. 3 is a rear end elevation of the extractor. Fig. 4 is a transverse section on the line 4—4 of Fig. 1. Fig. 5 is a sectional view on the line 5—5 of Fig. 1. Fig. 6 is a detailed transverse section on the line 6—6 of Fig. 5 looking in the direction of the arrows; and, Fig. 7 is a detailed section of one of the gripping jaws and eccentric in the absence of any fulcrum plate for the latter.

Similar characters of reference indicate the same parts in the several figures of the drawings.

8 and 9 indicate the gripping jaws of a molar extractor, the respective shanks 10 and 11 of which are of a length corresponding substantially with the length of the jaw of the animal to be operated on and for a horse about two and a half feet in length. At a point toward both ends of said shanks are bands 12 and 13 connecting the shanks and providing individual bearings whereby when the shanks are oscillated in opposite directions the gripping jaws may be moved toward each other to grip the molars to the extractor.

The gripping jaws, through their shanks 10 and 11, are actuated through the medium of arms 14 and 15 projecting at a right angle therefrom, rigidly secured to the rear ends of the shank upon angular seats 16—16, and held against accidental removal by means of screws 17—17. Passing through the arm 14 is a screw threaded rod 18 provided, at its inner end, with a swivel 19, secured rigidly to the arm 15, a thumb nut 20 on the rod serving to force and hold said arms toward each other, and in doing so swing the gripping jaws to a tightened position upon the molar to be extracted.

So far I have described means substantially old for moving the gripping jaws to a hold upon a molar and maintaining them in that position, but in such prior implements there is no mechanical means for lifting the tooth and loosening it from its socket such as will now be described.

In the bands 12 and 13, and extending from one band to the other, is a tube 21, in which free to turn is a shaft 22 lying between the shanks of the gripping jaws and provided on its end, adjacent said jaws, with an eccentric 23, the shaft being rotated by means of a handle 24 secured at its opposite ends and removable for convenience by means of a thumb screw 25.

The eccentric 23 is in the position shown in Fig. 2 until after the gripping jaws have been tightened upon the molar to be extracted, the eccentric resting upon the tooth next forward so that when the eccentric is actuated by turning the handle 24 the gripped tooth is thereby loosened and lifted from its socket by a direct pull axially therethrough, and this without any downward movement of the shanks of the gripping jaws. In other words, after the gripping jaws are fixed in their operative position upon the molar, the turning of the eccentric produces an upward movement of the gripping jaws and a vertical pull on the tooth, loosening the tooth in and lifting it from its socket sufficiently for its entire extraction by the exertion of very little force on the part of the operator and who may utilize a downward pressure upon the free end of the instrument, in which use the eccentric becomes the fulcrum of a lever of the first class.

In cases of malformation of the roots of the molar, in which more than ordinary force is required to loosen and lift it from its socket, the operator may, in the first instance, loosen and lift the tooth from its socket through lever power alone by first turning the eccentric from its position until it becomes a fulcrum of sufficient height for that purpose, but, except in extreme cases of malformation the eccentric alone is sufficient for loosening and lifting the tooth from its socket sufficiently to extract it with an ordinary pair of forceps—if not with the fingers.

As a means for eliminating the grinding movement on the teeth supporting the eccentric when turning it, a spring plate 26 may be fixed to the band 12 by a screw 27 so as to project in a plane below the eccentric, and afford a bearing surface therefor, and at the same time a fulcrum extending over two or more teeth forward of the molar to be extracted.

In practice it is found that the leverage of the implement and its direction upon the tooth to be extracted is such that the animal is subject to the least possible pain consistent with the extraction of the molar, thereby eliminating the suffering it has heretofore been subjected to for the extraction of molar teeth.

My invention is not limited to the details shown and described, for it may be embodied in other forms of devices, and in any device in which, after a tooth is gripped by the jaws, it may be lifted vertically from its socket by mechanically applied means capable of being actuated to produce a fulcrum conjointly with the teeth by means of which sufficient leverage is secured to loosen a molar in the socket on a line axially thereof.

Having described my invention, what I claim and desire to secure by Letters Patent is:

1. A veterinary molar extractor comprising in combination opposing clamping jaws, means for actuating said jaws, and a rotatable tooth lifting device interposed at a point adjacent to said jaws and between the shanks thereof, and adapted to lift from its socket a molar gripped by said jaws, substantially as described.

2. A veterinary molar extractor comprising in combination opposing gripping jaws, means for tightening the same upon the molar to be extracted, a shifting tooth lifting device between and adjacent said jaws, and a rotatable shaft for actuating said extractor to and from its operative position, substantially as described.

3. A veterinary molar extractor comprising in combination oscillating gripping jaws, means for actuating the same to grip the molar to be extracted, an eccentric adapted to bear against a tooth forward of said gripping jaws, and means for turning said eccentric upon its axis whereby the gripped tooth is loosened and lifted from its socket by a pull axially therethrough, substantially as described.

4. A veterinary molar extractor comprising in combination oscillating gripping jaws, means for moving said jaws to and from a gripping position of the molar to be extracted, an eccentric forward of said jaws and between the shanks thereof and having a shifting bearing on the tooth forward of that to be extracted, and a shaft for actuating said eccentric to vary the plane of said eccentric, substantially as described.

5. A veterinary molar extractor comprising in combination gripping jaws, fixed bearings therefor, mechanical means for actuating said jaws toward and from a gripping position, an eccentric arranged forwardly adjacent of said jaws and between the shanks thereof, an eccentric shaft, and means for actuating said shaft and fixed bearings therefor, substantially as described.

In witness whereof, I have hereunto set my hand and affixed my seal this first day of July A. D. 1909.

SOLA B. DUNN. [L. S.]

Witnesses:
JOHN G. ELLIOTT,
F. E. BROM.

Copies of this patent may be obtained for five cents each, by addressing the "Commissioner of Patents, Washington, D. C."